July 14, 1959  T. FLATOW ET AL  2,894,596
METHOD OF DETERMINING SEISMIC REFLECTING SUBSURFACES
Filed Oct. 5, 1955  3 Sheets-Sheet 1

INVENTORS.
Tobias Flatow,
Charles H. Carlisle,
BY
Frank S. Troidl
ATTORNEY.

July 14, 1959 T. FLATOW ET AL 2,894,596
METHOD OF DETERMINING SEISMIC REFLECTING SUBSURFACES
Filed Oct. 5, 1955 3 Sheets-Sheet 2
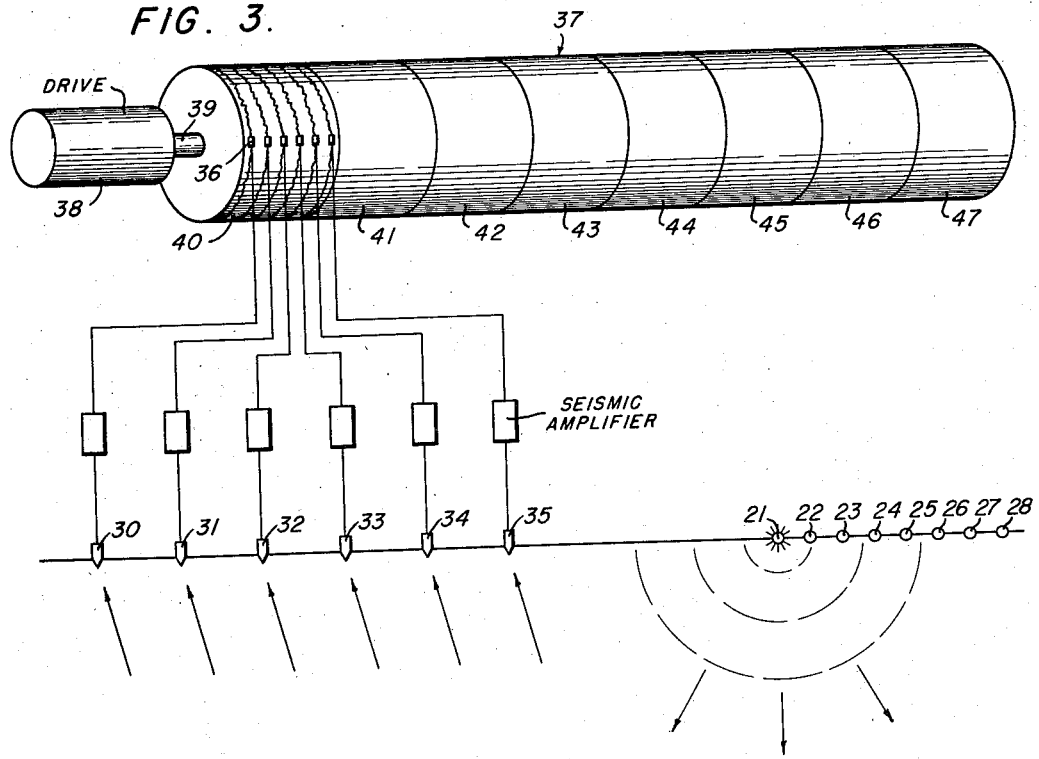
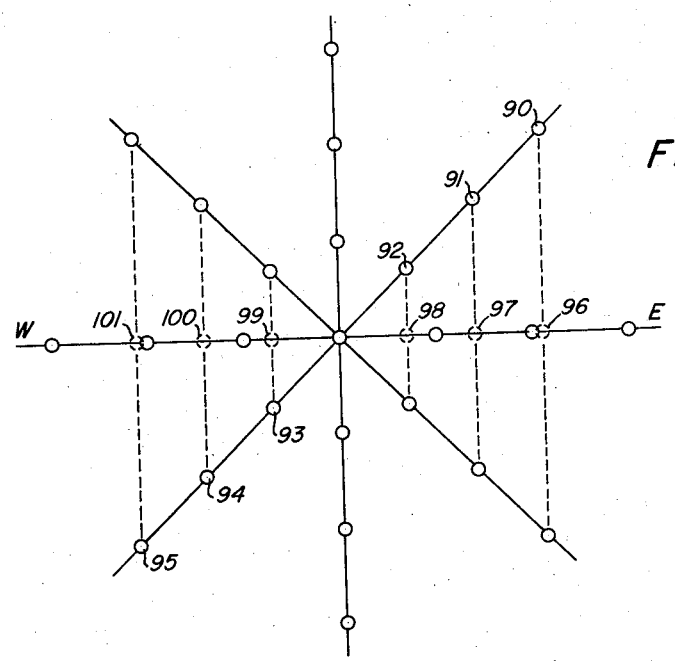
INVENTORS.
Tobias Flatow,
Charles H. Carlisle,
BY Frank S. Troidl
ATTORNEY.

INVENTORS.
Tobias Flatow,
Charles H. Carlisle,
BY
Frank S. Troidl
ATTORNEY.

United States Patent Office 2,894,596
Patented July 14, 1959

2,894,596

METHOD OF DETERMINING SEISMIC REFLECTING SUBSURFACES

Tobias Flatow and Charles H. Carlisle, Houston, Tex., assignors, by mesne assignments, to Jersey Production Research Company, Tulsa, Okla., a corporation of Delaware Application October 5, 1955, Serial No. 538,582

2 Claims. (Cl. 181—.5)

This invention relates to a new method of ascertaining the approximate dip and location of a subsurface seismic reflecting boundary. More particularly this invention relates to a method for determining the dip and location of a subsurface seismic reflecting boundary which is equivalent to generating a series of seismic waves in succession in such a manner as to cause the composite seismic wave to impinge perpendicularly upon the reflecting subsurface boundary.

In the art of seismic prospecting the usual procedure is to generate a seismic wave by means of a single shot point or a plurality of shot points arranged in a pattern, which seismic wave is reflected by subsurface boundaries between two formations having different elastic properties, and detecting at points spaced from the shot point or shot points the seismic waves which have been reflected. The detected seismic waves are amplified and recorded. From an examination of the records one may obtain the location of the subsurface boundaries causing particular seismic events indicated on the records.

Often a plurality of shots are arrayed in a pattern and are fired simultaneously, and the resultant composite wave has maximum energy in the vertical direction. Such a wave is spoken of in the profession as being "vertically" directed, though of course energy is also directed in other directions but in less amounts. Such vertically directed waves produce good seismic results if the reflecting boundaries have little or no dip. However, if the subsurface boundaries have a large dip, the maximum energy of vertically directed waves is reflected from the steeply dipping interface at such an angle as to return to the earth's surface outside the area of the normal pickup spread, and hence is not detected by the pickups. It has been found that by shooting off in succession dynamite located at spaced apart shot points with a particular time interval between each shooting, the composite seismic wave may be directed in a direction perpendicular to the subsurface reflecting boundaries and maximum reflected energy will be detected by the detector spread. This procedure is illustrated in the patent to J. F. Bayhi 2,706,011 issued April 12, 1955.

It has been found, however, that a trial and error shooting procedure must be followed in order to determine the proper time interval between each successive shooting for optimum results. This procedure is, of course, time consuming and the cost in many instances is prohibitive. Therefore, a method for accomplishing the same result as the result obtained from directing the composite seismic wave which does not involve the time consuming trial and error shooting method is highly desirable.

It is an object of this invention to provide a new method for determining the approximate dip of a reflecting subsurface boundary which does not involve a time consuming and costly procedure.

Briefly described, my new method consists of causing the generation of seismic waves from a point and detecting said seismic waves at a plurality of detecting points. The seismic waves thus detected are recorded. At any desired time after the generation of the first seismic wave a second seismic wave may be generated from a point spaced from the first point of seismic wave generation which seismic wave is detected at the same detecting points as the detecting points of the first seismic wave, and recorded. Any number of seismic waves from spaced points may be generated and detected by the detectors. The resulting recorded traces are subsequently combined in the laboratory in such a manner as to show up seismic events from which the approximate dip of the reflecting boundary can be determined.

A new apparatus for carrying out my new method is disclosed and may be briefly described as a means for electrically combining all of the traces recorded by each detector as a result of the above shooting process and producing a plurality of resultant electrical signals, one signal for each detector utilized with each resultant electrical signal being a combination of the traces obtained from each seismic detector. Means are described for changing the phase relationship of the traces from each seismic detector until the recorded resultant electrical signals indicate the approximate dip of subsurface boundaries.

Other objects and a fuller understanding of the invention may be had by referring to the following description and claims, taken in conjunction with the accompanying drawings in which:

Fig. 3 is a diagrammatic view of a system for recording seismic reflections according to my new method;

Fig. 5 is a diagrammatic view of an areal arrangement of shot points which may be utilized in carrying out my new method.

Figure 1:
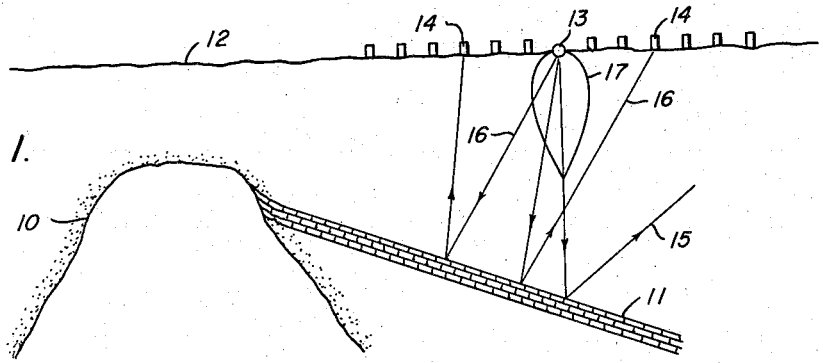
Figs. 1 and 1A are cross-sectional views showing the steeply dipping subsurface formations such as might be encountered in areas near salt domes and showing the desirability of directing the seismic wave toward the reflecting boundaries.

Referring to the drawing and more particularly to Fig. 1, numeral 10 represents a salt dome in the vicinity of which seismic prospecting is being carried out. It has been found that in salt dome areas the seismic reflecting boundaries such as shown at 11 often have a steep dip, the dip being defined as the angle between the horizontal and the reflecting boundary. Located on the earth's surface 12 is an area from which seismic waves are generated such as shot area 13. A seismic spread or spreads is arranged about shot area 13 and indicated by the numeral 14.

Figure 1A:
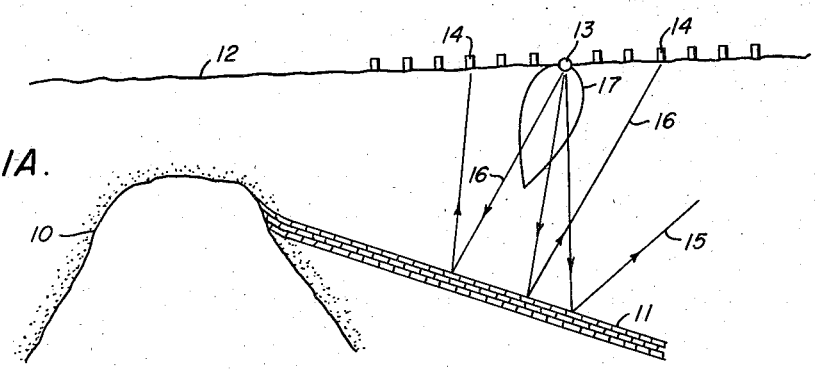

With reference to the condition illustrated in Fig. 1 suppose that the seismic wave is generated vertically downward from the earth's surface. The energy distribution of the wave with respect to direction can be represented by a lobe such as 17. It is clear from the figure that the energy directed vertically downward, which is assumed to be the direction in which maximum energy is radiated will be reflected at a large angle from the vertical and will be lost, as shown by path 15. The energy reflected to the pickups, following paths 16, will be considerably reduced in magnitude. It would be highly advantageous to direct the energy as represented by the lobe of Figure 1A, where the direction of maximum energy is very nearly perpendicular to the beds. Here it is clear that almost maximum energy is reflected back to the pickups and that the energy reflected beyond the area of the pickups is of reduced amplitude.

To impart a directivity effect to the seismic wave the procedure has been formerly to set off a series of successive shots, with the same time delay between each shot so as to cause the composite seismic wave to be directed perpendicularly toward the reflecting beds.

Steeply dipping beds may also be found in areas where there are no salt domes such as the steeply dipping areas of the state of California. The inclusion of the salt dome 10 in Fig. 1 is merely for purposes of illustration.

Figure 2:
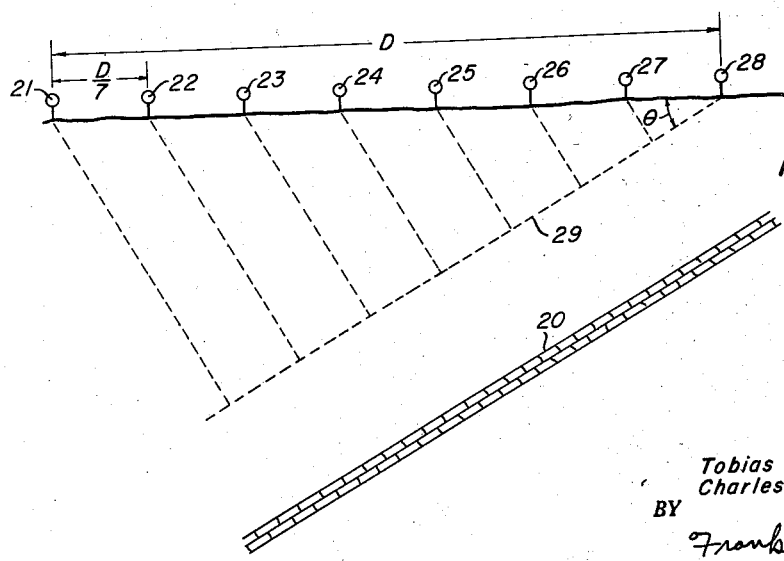
Fig. 2 is a cross-sectional view illustrating the procedure formerly utilized for directing a seismic wave toward a reflecting boundary prior to my new method.

The geometry involved in determining the proper time delay between each successive shot point is illustrated in Fig. 2. With reference to Fig. 2 let it be assumed it is desired to direct a composite seismic wave perpendicular toward a reflecting subsurface boundary 20. In actual practice the shots designated 21 to 28 inclusive will be fired succesively a number of times with a different time delay between successive shots at each trial and the recordings thus obtained examined until reflections show up on the records which indicate that the greatest amount of energy generated by shots 21 to 28 inclusive has been reflected from subsurface boundary 20. That the greatest amount of energy has been reflected from boundary 20 and detected is evidenced by a higher amplitude of reflecting events on the records than is obtained with other time delays between the successive shots. When the proper time delay has been determined, the seismic wave will progress in a manner such as shown in Fig. 2 in which the dashed line 29 represents the composite seismic wave front, with the angle $\theta$ being quivalent to the angle of dip of boundary 20. The distance from shot point 21 perpendicularly to the wave front 29 is equal to the distance D times $\sin \theta$. If the velocity of propagation of the composite seismic wave 29 is represented by the letter V, the time $T_1$ for the wave to travel from shot point 21 to the wave front 29 is:

$$T_1 = \frac{D \sin \theta}{V}$$

The time delay between each successive shot in order to properly direct the wave front 29 is therefore equal to $$\frac{D \sin \theta}{7V}$$

My new method of determining the approximate dip of a reflecting subsurface boundary consists of generating a seismic wave from a point such as point 21 and detecting the seismic wave thus generated at a plurality of points spaced from point 21 by means such as the seismic detectors 30 through 35 inclusive (Fig. 3). The detected reflected energy is amplified and recorded by recording means such as the recording electromagnetic heads 36. The detected reflected energy is recorded as a trace of varying magnetization on a rotating magnetic drum 37, with the degree of magnetization being proportional to the amplitude of the voltage generated by the seismic detectors which in turn is proportional to the amplitude of the detected reflected seismic wave. The rotatable magnetic drum 37 is rotated by means of a drive 38 and shaft 39. The magnetic recording heads 36 are movable and can be moved from their position shown in Fig. 3 to areas 41 through 47 each longituinally spaced from one another.

At any desired time after the generation of the first seismic wave from shot point 21 a second seismic wave may be generated from a point spaced from point 21, such as point 22. The seismic wave thus generated and reflected is also detected by seismic detectors 30 through 35 inclusive and recorded at 41 on drum 37. Hence, the magnetic drum 37 will have the traces resulting from the detection of the second seismic wave recorded longitudinally spaced from the first recorded traces on said rotating drum 37. The same procedure is followed for shot points 23, 24, 25, 26, 27 and 28 with the traces being recorded at 42 to 47 on drum 37. In practicing this new method the seismic crew need not worry about the proper time delay between each subsequent shot. The time period between each shot may be any arbitrary or desired time period and the time delay between shots need not be the same.

According to the well known superpositioning principle of physics, one can take the traces recorded by each of the geophones 30 through 35 as a result of the seismic waves generated from shots 21 through 28 inclusive, and combine these traces in such a manner as to emphasize the energy generated from each of the shots 21 to 28 in a direction perpendicular to a reflecting subsurface boundary. The results obtained will be substantially equivalent to the results obtained by firing a series of shot points with a specific time delay between each shot such as explained with reference to Fig. 2.

Figure 4:
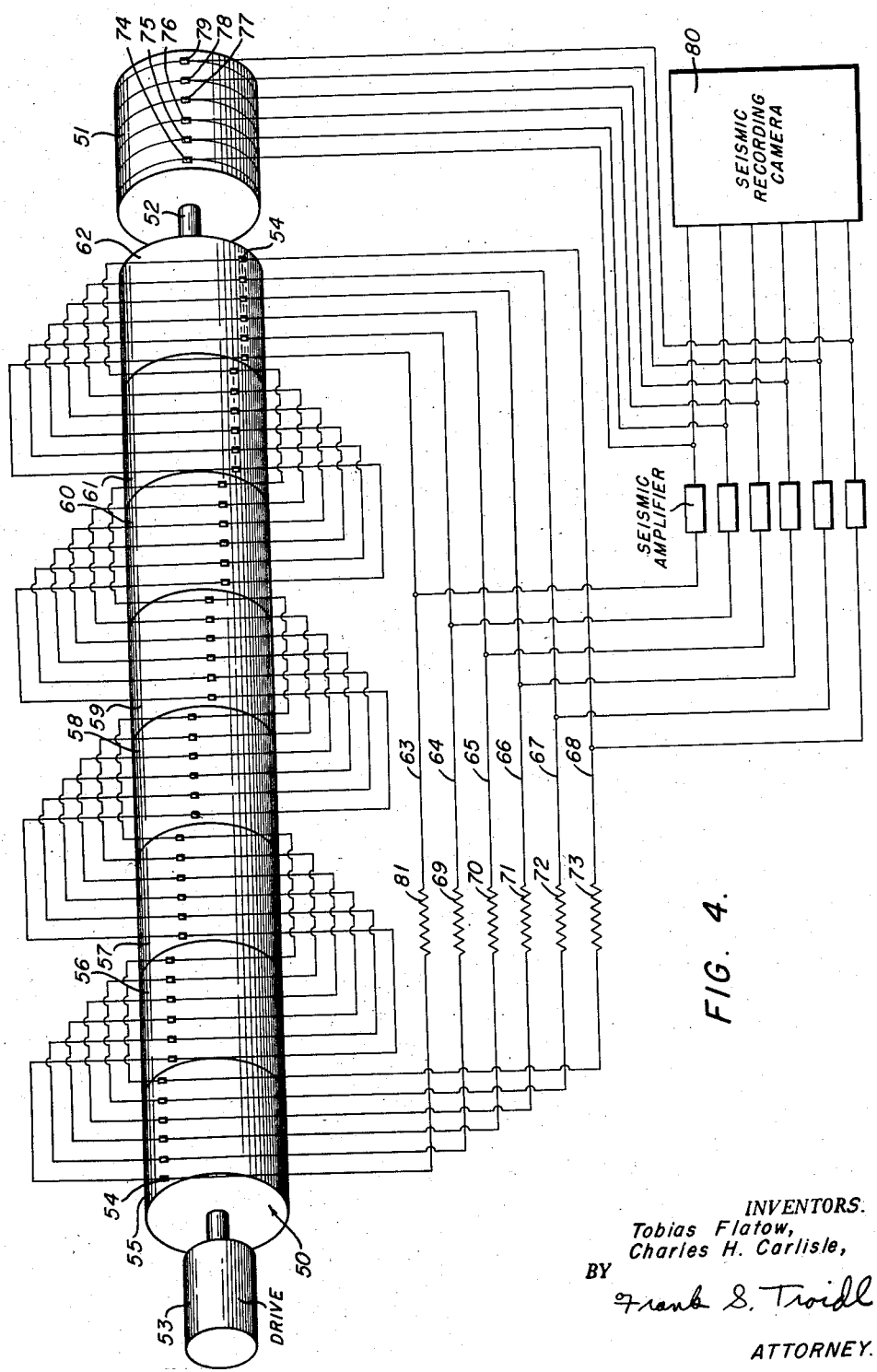
Fig. 4 is a view partly in diagram showing an analyzing system suitable for use in my new method.

An apparatus suitable for carrying out the combining of traces from each detector is shown in Fig. 4. Fig. 4 shows a first rotatable drum 50 upon which the record has been transcribed, and a second rotatable drum 51 which rotatable drums have a common shaft 52. The drums are rotated in unison by means of a driving means 53. A plurality of magnetic reproducing heads 54 are placed about the rotatable drum 50. The sections 55 through 62 of the rotating drum 50 have thereon the recorded traces obtained from shots 21 through 28 respectively. There are 6 magnetic reproducing heads for each section corresponding to the 6 detectors of Fig. 3.

The first reproducing heads on each of the sections 55 through 62 are connected together in series by means of electrical conductors 63 and adding resistor 81. Similarly the second, third, fourth, fifth and sixth reproducing heads are each connected together in series by means of electrical conductors 64, 65, 66, 67 and 68 and adding resistors 69, 70, 71, 72 and 73, respectively. Each of the electromagnetic heads 54 connected in series reproduces the traces on magnetic drum 50 as electrical signals which are amplified by means of seismic amplifiers and then recorded as a resultant seismic trace on recording heads 74, 75, 76, 77, 78 and 79. Arranged electrically parallel to the rotatable drum 51 is a seismic recording camera indicated at 80 for making a paper recording of the resultant electrical signals. Each series of reproducing heads 54 is adjustably connected about the circumference of the rotating drum 50 and hence may be adjusted along the circumference of drum 50.

In carrying out my new method of obtaining the approximate dip of a reflecting subsurface formation each series of magnetic heads 54 is moved about the circumference of drum 50 with a particular time difference being set between each series. The combination of the traces obtained from each of the detectors 30 through 35 is recorded as a resultant electrical signal on the drum 51. The time difference between each successive series of heads 54 is then changed and another record taken. As the time difference about the magnetic drum 50 of each series of magnetic heads 54 approaches a time difference which is equivalent to directing the seismic energy of the shot points from which the records were obtained in a direction perpendicular to the subsurface reflecting boundary, reflecting seismic events will appear on the seismic recording camera 80 and drum 51, with the greatest amplitude of the seismic events occurring when the proper time difference has been set on the rotating drum 50. From a determination of this time difference the approximate dip of the reflecting seismic subsurface can be determined. Hence the seismic crew is notified of the approximate dip of the reflecting subsurface boundary without having been required to use a costly and time consuming trial and error procedure such as the procedure shown in connection with the procedure followed in determining the perpendicular direction to the reflecting subsurface as shown in Fig. 2. Having now determined the approximate dip of the reflecting subsurface, if desired, subsequent seismic prospecting in areas where a reflecting subsurface 20 (shown in Fig. 2) is located using the system shown in Fig. 2 may be utilized to obtain in greater detail the exact position of reflecting subsurface 20.

Under some circumferences it may be desirable to utilize an areal arrangement of shot points such as shown in Fig. 5 rather than an inline array such as shown in Fig. 2. More magnetic recordings and re-recordings would be necessary utilizing the arrangement shown in Fig. 5 but the procedure would be exactly the same as previously explained. If shot directivity to the west or east is desired, the proper time delay between each successive shot utilizing an areal area of shot points however would be determined by projecting onto the east-west line the shot points such as shot points 90 through 95 inclusive upon the east-west line. The projected positions of points 90 through 95 are shown as dotted circles 96 through 101, respectively. From its position thereon the time delay for each shot point can be determined by use of the simple formula previously outlined. Just as in the case of the inline array of shot points my new method and apparatus can be utilized for accomplishing the same directivity effect as is accomplished by shooting off the shot points shown in Fig. 5 with a particular time delay between each shot.

Although we have described our invention with a certain degree of particularily, it is understood that the present disclosure has been made only by way of example and that numerous changes in the method and details of construction and the combination and arrangement of parts may be resorted to without departing from the spirit and scope of the invention as hereinafter claimed. What we wish to claim as new and useful and to secure by Letters Patent is:

1. A method of obtaining the effect of directing shot energy which includes the steps of: causing the generation of seismic waves from a given point; detecting said seismic waves with seismic detectors at at least a first detecting point and a second detecting point spaced from one another, said detecting points and the given point of generation of seismic waves lying along a straight line, said detecting points being spaced from said seismic wave generation point; recording the signals thus produced by said seismic detectors as a plurality of traces, one trace being recorded for each detector; subsequently causing the generation of seismic waves from at least one other point spaced from said given point of seismic wave generation and from said detecting points, and lying on said straight line; detecting said seismic waves at said detecting points and recording the voltages thus produced as a plurality of traces, one trace being recorded for each detector; combining all of the traces recorded from signals produced at said first detecting point; combining all of the traces recorded from signals produced at each of the other detecting points; and shifting the phase relationship between the traces being combined until the phase relationship at which recorded resultant electrical signals are maximized is found so as to indicate the approximate dip of said boundary.

2. A method in accordance with claim 1 wherein the time interval between each seismic wave generation is any desired time intereval.

References Cited in the file of this patent

UNITED STATES PATENTS

| | | |
|---|---|---|
| 2,394,990 | Eisler | Feb. 19, 1946 |
| 2,427,421 | Rieber | Sept. 16, 1947 |
| 2,620,890 | Lee et al. | Dec. 9, 1952 |
| 2,732,906 | Mayne | Jan. 31, 1956 |
| 2,767,389 | McCollum | Oct. 16, 1956 |
| 2,779,428 | Silverman | Jan. 29, 1957 |
| 2,795,287 | Sharpe | June 11, 1957 |

OTHER REFERENCES

Handley: "How Magnetic Recording Aids Seismic Operations," Oil & Gas Journal, January 11, 1954, vol. 52, No. 36, pages 158–159. (Copy in 181–0.53.)

Palmer: "A New Approach to Seismic Exploration," World Oil, June 1954, vol. 138, No. 7, pages 140, 162, 146, 148, 151, 154, 156 and 158. (Copy in 181–0.53.)